US006700094B1

(12) United States Patent
Kuntze

(10) Patent No.: US 6,700,094 B1
(45) Date of Patent: Mar. 2, 2004

(54) DEVICE FOR LASER WRITING ON MATERIALS

(75) Inventor: Andreas Kuntze, Berlin (DE)

(73) Assignee: Compact Laser Solutions GmbH, Berlin (DE)

( * ) Notice: Subject to any disclaimer, the term of this patent is extended or adjusted under 35 U.S.C. 154(b) by 0 days.

(21) Appl. No.: 09/367,018

(22) PCT Filed: Feb. 6, 1998

(86) PCT No.: PCT/DE98/00447

§ 371 (c)(1),
(2), (4) Date: Aug. 5, 1999

(87) PCT Pub. No.: WO98/34789

PCT Pub. Date: Aug. 13, 1998

(30) Foreign Application Priority Data

Feb. 6, 1997 (DE) ........................................ 197 06 086

(51) Int. Cl.[7] ................................................ B23K 26/00

(52) U.S. Cl. ............................. 219/121.6; 219/121.69; 219/121.68; 219/121.67

(58) Field of Search ......................... 219/121.6, 121.69, 219/121.68, 121.67; 33/DIG. 21; 347/224

(56) References Cited

U.S. PATENT DOCUMENTS

| | | | | | |
|---|---|---|---|---|---|
| 4,467,172 | A | * | 8/1984 | Ehrenwald et al. | 219/121 LH |
| 5,030,551 | A | * | 7/1991 | Herren et al. | 430/495 |
| 5,049,721 | A | * | 9/1991 | Parnas et al. | 219/121.68 |
| 5,418,088 | A | * | 5/1995 | Alexandres | 429/175 |
| 5,503,483 | A | | 4/1996 | Petteruti et al. | 400/88 |
| 5,751,436 | A | * | 5/1998 | Kwon et al. | 358/299 |
| 5,801,356 | A | * | 9/1998 | Richman | 219/121.68 |
| 5,932,119 | A | * | 8/1999 | Kaplan et al. | 219/121.68 |

FOREIGN PATENT DOCUMENTS

| | | |
|---|---|---|
| DE | 24 18 064.1 | 10/1975 |
| DE | 33 18 768 A1 | 11/1984 |
| DE | 39 06 336 A1 | 8/1990 |
| DE | 40 17 202 A1 | 12/1991 |
| JP | 08001999 | 1/1996 |
| JP | 08271995 | 10/1996 |
| WO | WO 90/11892 | 10/1990 |
| WO | WO98/29774 | 7/1998 |

OTHER PUBLICATIONS

W. Weinfurtner, "Licht schreibt—Beschriften mit dem Laser in der Industrie—Grundlagen und Einsatzgebiete" Expert–Verlag 1995, Kontakt & Studium vol. 479 (English summary).

* cited by examiner

*Primary Examiner*—M. Alexandra Elve
(74) *Attorney, Agent, or Firm*—Christie, Parker & Hale, LLP

(57) ABSTRACT

A device for inscribing materials has a hand-held device and a support device. The devices have a laser, a refraction unit, a control unit and a power pack consisting of compact, transportable components. The devices are connected to one another by means of a cable or glass fiber connection.

46 Claims, 3 Drawing Sheets

DEVICE FOR LASER WRITING ON MATERIALS

FIELD OF THE INVENTION

The invention relates to a device for inscribing materials with a laser.

BACKGROUND OF THE INVENTION

The text, Walter W. Weinfurtner, "Licht schreibt—Beschriften mit dem Laser in der Industrie: Grundlagen und Einsatzgebiete", Expert-Verlag 1995 (Kontakt & Studium; Volume 479) disclosed the principle and the basic structure of a laser inscriber, consisting of a solid-state laser with a laser head with, for example, an optical path, on which the individual optical components are mounted in such a way as to ensure temperature stability and mechanical stability.

In the laser head of the solid-state laser there is a resonator, which consists of a so-called pump chamber, two reflectors and an acoustic-optical switch, a so-called Q-switch. In the pump chamber there is a YAG crystal rod and one or several krypton arc-lamps whose light is reproduced in the crystal rod which emits light with a certain wavelength at both ends. This light is reflected by the two reflectors back into the crystal rod, whereby the reflector at the rear end of the resonator reflects around 99.9%, whereas the front reflector transmits 12% and thus forms the operating beam. The Q-switch interrupts the operating beam up to 40,000 times per second and thus produces output peaks up to 1000 times the continuous wave laser operation.

Furthermore, the resonator contains a mechanical switch (shutter) for interrupting the laser beam and a support, in which a mode filter is set to suit the specific application, in order to achieve higher beam quality (including, for example, in basic mode operation). In a beam spreader, the laser beam leaving the resonator is spread by a factor of 2 to 10. The spread laser beam is refracted in a refraction unit by means of two galvanometer reflectors in the x and y directions and focused on a work-piece by means of a flat field focusing lens.

Further, components of the existing laser inscriber are a computer for driving a control unit which controls the refraction device, a Q-switch driver and a power pack. An additional, costly cooling device is provided for cooling the pump chamber.

The existing laser inscriber is formed as a laser installation with an x-y stage table, a round switching table with input and output tunnel and possibly a twin- head configuration, like when it is used as a solid-state laser for material processing too, i.e. for separating, joining, boring and the like with high laser power, whereby the laser is additionally to be connected to a power supply cabinet and possibly to an external heat exchanger. A laser inscription installation of this nature, as is also the object of DE3318768A1, has a bulky construction and can therefore only be used at fixed locations. Such an installation also has a considerable power consumption and a low rate of efficiency, as a large proportion of the power must be removed by means of the cooling device in order to ensure problem-free operation.

A laser installation of this nature has considerable dimensions and requires a water supply for cooling the laser. It also requires a three-phase current connection with a power consumption of around 8 kW. This laser installation requires extensive maintenance, as the presence of the water supply means that an ion exchanger and a particle filter are necessary. High lamp consumption and considerable wear and tear of the pump chamber must also be taken into consideration.

As can be seen from DE3318768A1, a laser inscription installation of this nature also requires a costly alignment device and a refraction head containing numerous optical components whereby there is a scattering lens and a converging lens of the widening lens system, reflectors and the like. These make the manufacture, maintenance and operation of the existing laser inscription installation expensive.

JP-A-08 001 999 discloses a further laser inscription installation which has a low power laser and a refraction unit. By means of this installation, an image is produced on a photo-sensitive upper surface of a drum through electrostatic charging. For this purpose, the drum is exposed to a laser beam. In order that the entire upper surface of the drum can be exposed, the drum rotates around its rotation axis. In addition, the refraction unit is positioned in the longitudinal direction of the drum along the upper surface of the drum in such a way that it can move.

The existing device is used in a laser printer in order to inscribe paper. For this purpose, toner is applied to the drum, whereby the toner only sticks to the electrostatically charged areas of the drum. In order to apply the toner to the paper, the paper is then passed over the drum.

The disadvantage of the existing device is that it requires a costly and precise guide facility, in order to ensure a sufficient relative movement between the drum and the refraction unit in such a way that the entire upper surface of the drum can be reached by the laser beam. Among other things, this necessitates a costly alignment device to ensure that the laser beam, by means of the refraction unit, reaches each position on the upper surface of the drum.

The precise guide facility also means that the existing device must be installed at a fixed location. In order to use the existing device at another location, it must first of all be dismantled, transported to the other location and then put together again. This necessitates an enormous amount of resources which results in high costs. In principle, therefore, the existing device can only be used at a fixed location.

Furthermore, with the existing device it is not possible to produce engravings and inscriptions on objects by means of material vaporization. This is only possible when using a high-power laser. If such a high-power laser were used with the existing device, this would mean that the dimensions of the installation would be greatly increased.

SUMMARY OF THE INVENTION

It is an object of the present invention to create a device for inscribing virtually any material with a laser with considerably smaller dimensions and considerably lower weight as well as optimum handling and the greatest possible mobility whereby this is achieved with low manufacture and operating costs, as well as low power consumption and low maintenance requirements.

The solution according to the invention creates a mobile device for inscribing objects with a solid-state laser, whereby this device is characterized by small dimensions and low weight, as well as by simple construction. The form of the inscription device can differ both in relation to data input and in relation to the output head. It can also be connected to any peripheral devices such as a digital video camera, a CCD image sensor, a scanner and the like.

By bringing together several respective components in at least one package, the configuration of the inscription laser can correspond to an application-oriented structure.

In a first embodiment of the solution, according to the invention, the inscription device consists of a hand-held device which contains a refraction unit and a solid-state laser and is connected by means of a cable connection to a support device which has a control unit and a power pack, for example, an accumulator and/or a main unit. In addition, there is an interface for connecting the control unit to an external control and/or input unit.

In a second embodiment of the solution, according to the invention, the hand-held device contains only the refraction unit and is connected by means of a glass fiber cable to a support device which contains the solid-state laser, the control unit and the power pack. In this case also, there is an interface for connecting the control unit to the external control and/or input unit.

In a third embodiment of the invention, all the components can be brought together in one package which is formed as a hand-held device or a desk-top device.

In all three embodiments of the invention, the dimensions are so compact that the hand-held device can, for example, be formed as a gun and the support device can be housed in a package which can be attached to a user by means of a waist and/or shoulder strap. With this construction, maximum mobility is achieved and this enables the user to carry out laser inscriptions at any location independently of a power supply cabinet and the like.

It is particularly advantageous if the hand-held device is connected to a sensor unit, for example a scanner, a video camera or a digital camera. For example, this enables an image to be recorded with the sensor unit, and to be produced on an object by means of the hand-held device. Therefore, the device is preferably suited for the administration of a warehouse used for the storage of goods which have a bar-code for identification purposes. For example, the bar-codes are read by means of the scanner, transmitted to a computer located in the hand-held device or to another superordinate central computer, where they are processed. Should it ever be necessary to change the bar-code, the old bar-code can easily be made indecipherable, or removed by means of the hand-held device and the new bar-code can be put on the goods.

In an advantageous embodiment of the solution according to the invention, there is a recording unit for the objects which are to be inscribed, whereby this recording unit contains a distance-measuring device for emitting a distance reading which controls the focusing of the laser beam. The recording unit also contains a switching device for releasing the laser beam when the object to be inscribed is correctly positioned. As an alternative, there is a mechanical catch for static focusing of the laser beam.

The inclusion of a recording unit, for objects to be inscribed, ensures reliable positioning of the object in the focal plane of the laser beam. It also ensures reliable operation of the inscription device.

As an alternative or additionally, there is a lens system, for example a lens system of an auto-focus camera, for the purpose of adjusting the focus distance.

In a preferred embodiment of the invention, in order to ensure maximum mobility of the unit, the control unit is connected to an external control and/or input unit wirelessly by means of a radio, infra-red or ultrasound transceiver.

The control unit and possibly components of the power pack are preferably composed from foil circuits using SMD technology. They are therefore particularly suitable for a compact structure and housing in component packages which can be carried on the body of the user.

In order to ensure the smallest possible dimensions and a maximum efficiency rate, the laser consists of a solid-state laser which is pumped longitudinally with a laser diode, whereby this solid-state laser contains a laser bank with a laser crystal, a Q-switch, a highly-reflecting resonator reflector and an output reflector. The laser crystal thereby preferably has no tension birefringence or has a tension birefringence which is as low as possible, and in addition it has high fluorescence durability and the smallest possible dimensions.

The solid-state laser can be equipped with an active Q-switch, i.e. with an opto-acoustic crystal, or with a passive Q-switch and a laser diode, which among other things, is driven in pulsed operation.

The efficiency rate of the laser diode is preferably as high as possible. In order to ensure that this efficiency rate remains stable, the laser diode is cooled with a cooling component, for example a Peltier component. It is provided that both the laser diode driver and the Peltier driver are positioned either in the hand-held device or in the support device. The term "driver" is used here to denote the corresponding circuit board of a component.

The individual laser components are preferably in a very compact arrangement in relation to one another, in order to achieve minimum dimensions and thus ensure mobile operation.

In particular, short resonator geometry is used, which means that very short laser pulses, and thus, a high pulse peak output are achieved. In order to ensure a configuration that is as compact as possible with small external dimensions, the short resonator geometry is preferably achieved by means of a folded optical train brought about by an appropriate reflector configuration, for example, two reflectors positioned at 45° to the axis of the beam.

In addition, the device has another lens system for spreading the beam, preferably by means of two lenses. Alternatively or additionally, the beam is spread by means of a further reflector system comprising at least two reflectors, whereby this reflector system preferably also has a folded optical train through multiple reflection.

In a preferred embodiment of the invention, polarizers are provided, in order to generate polarized laser light. This light can, however, also be generated through the laser crystal itself. In this way, it is possible to increase the diffraction efficiency rate of an acoustic-optical Q-switching component. This is particularly advantageous because the device according to the invention preferably has at least one lens system with a high diffraction efficiency rate, in particular a crystal, whereby this lens system efficiently interrupts the laser process in the resonator at the same time as there is low high-frequency power input.

In order to further increase the compactness and to minimize the weight, the components of the device according to the invention are manufactured from fiber reinforced materials, ceramics or synthetic materials. In addition, the lens systems are put together and/or are secured by means of sticking.

In order to ensure a fast, accurate and cost-effective drive for the refraction unit, in a preferred embodiment of the invention, the motor of the drive unit, by means of which the refraction unit is adjusted, is constituted by a drive unit of a read/write head of a data storage unit, in particular a magnetic or optical data storage unit. However, the invention is not restricted to this type of drive unit. Moreover, conventional drive units, for example galvanometer scanners, can also be provided as drive units for the refraction unit.

BRIEF DESCRIPTION OF THE DRAWINGS

By reference to the embodiments of the invention shown in the drawings, the thought behind the invention will now be examined in greater detail.

DETAILED DESCRIPTION OF THE PREFERRED EMBODIMENT

Figure 1:
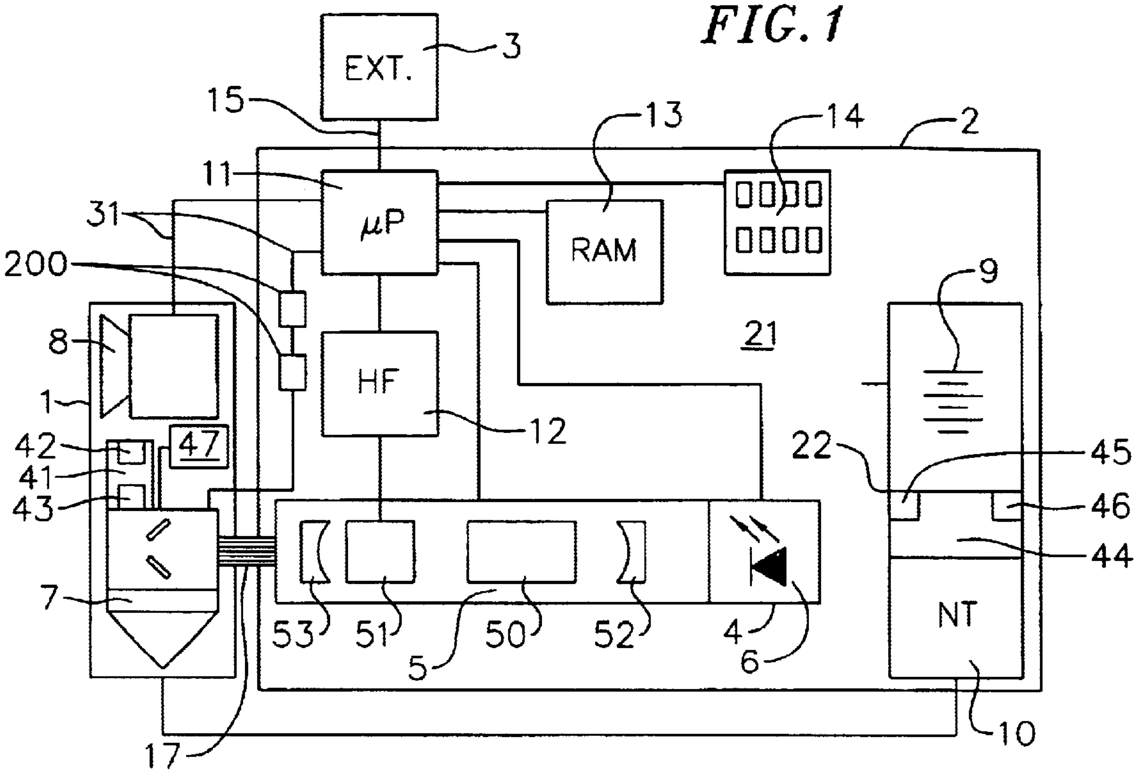
FIG. 1 shows a schematic functional block diagram of a hand-held laser inscription device with a solid-state laser positioned in a support device.
Figure 2:
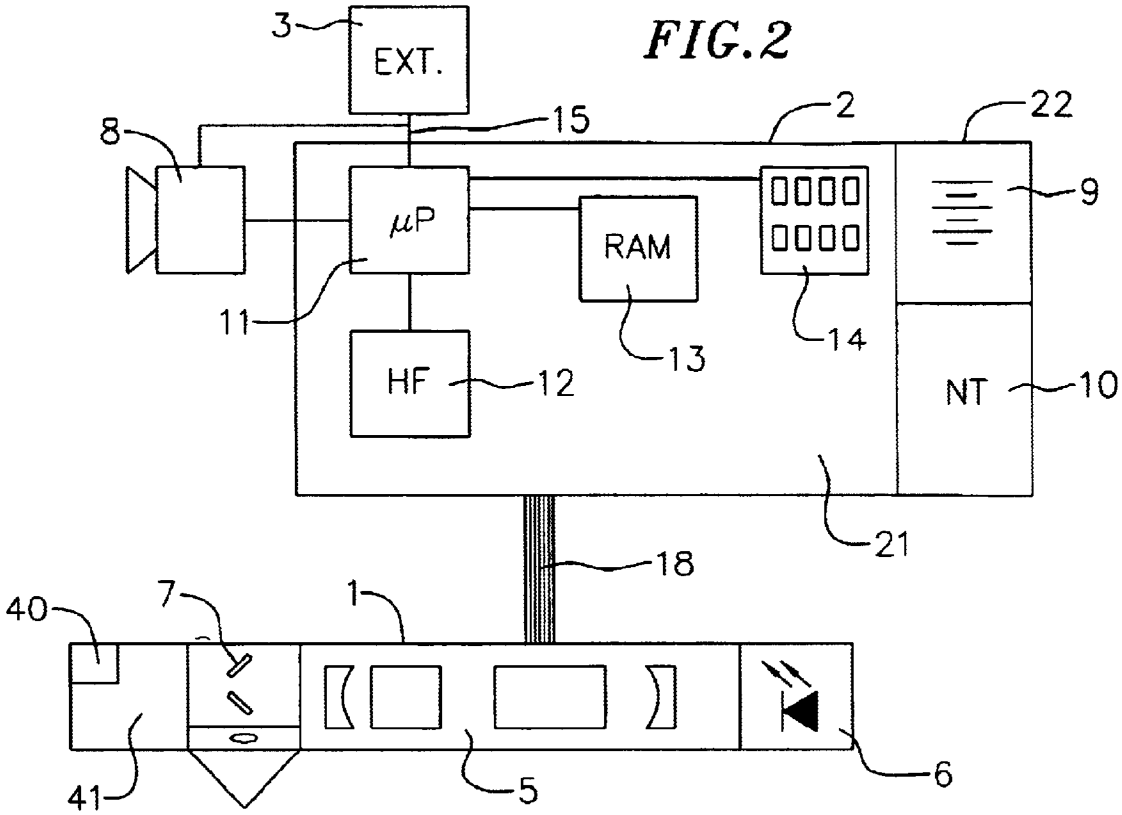
FIG. 2 shows a schematic functional block diagram of a hand-held laser inscription device with a solid-state laser positioned in the hand-held device.

The schematic functional block diagrams shown in FIGS. 1 and 2 for devices for inscribing objects with a solid-state laser show different configurations of the same components. They can be supplemented by further embodiments of the invention which consist of similar configurations, for example, bringing together all of the components in a laser inscription device with one package, whereby this device is in the form of a desk-top device as a mobile inscription station.

The term “inscription” is used to denote any form of object markings, for example marking with any type of script, as well as generating images and three-dimensional engravings. Furthermore, the term “inscription” is understood to include the removal of inscription elements by taking away layers of surface material (e.g. bar-codes, graffiti, etc.) and the like.

FIG. 1 shows the functional block diagram of a compact hand-held laser inscription device which comprises a hand-held device 1 and a one-part or two-part support device 2. In this embodiment of the invention, the hand-held device 1 contains a refraction unit 7 which is placed in front of the object to be inscribed or the refraction unit can be connected to a recording unit 41 for recording and aligning the object which is to be inscribed. The recording unit 41 contains a distance-measuring device 42 for emitting a distance reading which controls the focusing of the laser beam. The recording unit also contains a switching device 43 for releasing the laser beam when the object to be inscribed is correctly positioned. As an alternative, there is a mechanical catch 40 for static focusing of the laser beam (shown in FIG. 2). Furthermore, the hand-held device 1 contains a sensor unit 8, which can, for example, consist of a scanner, a CCD image sensor or a digital video camera.

The support device 2 contains a control unit 21, a solid-state laser 4 and a power pack 22 connected to the control unit of the support device. The control unit 21 has a microprocessor 11, a high-frequency generator 12, a read/write storage unit or another storage medium 13, signal amplifiers 200 for amplifying the control signals for the reflector alignments (galvanometer scanners) in the refraction unit 7, and an input and monitoring unit 14. The solid-state laser 4 consists of a laser bank 5 (or another mechanically stable construction of the laser components) and a laser diode 6. The laser bank 5 contains a longitudinally or transversely pumped laser crystal 50, a Q-switch 51 (active or passive Q-switching), a highly-reflecting resonator reflector 52 and an output reflector 53.

A drive unit 47 of the reflector alignments in the refraction unit 7 may be constituted by a drive unit of a read/write head of a data storage unit, in particular a magnetic data storage unit. In this case, it is possible to omit the signal amplifiers 200, as the drive unit of the read/write head itself already has such signal amplifiers.

The end of the solid-state laser 4 is connected to the refraction unit 7 by means of a glass fiber cable 17. The glass fiber cable 17 can be combined with an electric cable containing connection wires 31 between the microprocessor 11 and the sensor unit 8, and between the microprocessor 11 and the refraction unit 7. The glass fiber cable can also be combined with a power supply cable for connecting the power pack 22 to the hand-held device 1. If the control unit 21 and the solid-state, laser 4 are positioned separately from the power pack 22, for example in different packages or sections of a package, an additional power supply cable must be provided between the control unit 21 and the solid-state laser 4 on the one hand, and between the control unit and the power pack 22 on the other hand.

The power pack 22 comprises an accumulator 9 and a main component 10. Also positioned in this power pack is a cooling device 44 having a Peltier component 45. A driver 46 of the Peltier component 45 is provided.

An interface 15 connects an external control and monitoring unit 3 to the microprocessor 11 of the control unit 21 for the purpose of inputting data as required. Instead of an external control and monitoring unit 3 which can be connected to the control unit 21 by means of a cable, wireless transmission is also possible. This means that instead of an interface connection point for the interface 15, there can be electromagnetic, electro-optical or electro-acoustic transmission of signals between an external control and monitoring unit and the control unit 21. Alternatively, there can be direct data input, for example by means of a miniature lap-top.

The solid-state laser 4 consists of a solid-state laser which is longitudinally or transversely pumped with the laser diode 6, whereby the laser bank 5 of the solid-state laser does not contain any polarizers for the purpose of increasing the efficiency rate and thus ensuring maximum output. The laser crystal 50 is a crystal without tension birefringence or with tension birefringence that is as low as possible, whereby the dimensions of the crystal are as small as possible. In association with low output of a high-frequency generator, the high-frequency output of which is, for example, less than or equal to 2 to 4 watts, and an optimum choice of laser crystal 50, the construction of the laser bank 5 can be extremely compact, since low power consumption leads also to only limited heat emission.

The operation of the laser bank 5 can be continuously pumped with an active Q-switch (high-frequency source), using an opto-acoustic crystal, or it can take place with a passive Q-switch.

The compactness of the device, according to the invention, can be further increased by using a folded optical train with reflectors, and the like, in the refraction unit 7 or in the laser head. All in all, a portable laser inscription device with the smallest possible external dimensions and weight is thus created.

According to an embodiment of a laser inscription device which is shown in FIG. 2 as a functional block diagram, the solid-state laser 4 is brought together with the refraction unit 7 in a hand-held device 1. Furthermore, the control unit 21 is brought together with the power pack 22 in a support device 2.

The control and supply device is connected to the hand-held device 1 by means of an electric cable 18. By means of an interface 15, the control and supply device further connects with both an external control and monitoring unit 3 and a sensor unit 8. As in the embodiment of the invention according to FIG. 1, this sensor unit 8 can consist of a digital (video) camera, a CCD image sensor or a scanner. Also, as in the embodiment according to FIG. 1, the sensor unit 8 can be coupled with the hand-held device 1, in such a way that the hand-held device 1 can also be used for receiving signals. Also positioned in the support device 2 are two (not illustrated) signal amplifiers for amplifying the control signals for the reflector alignments in the refraction unit 7.

Figure 3:
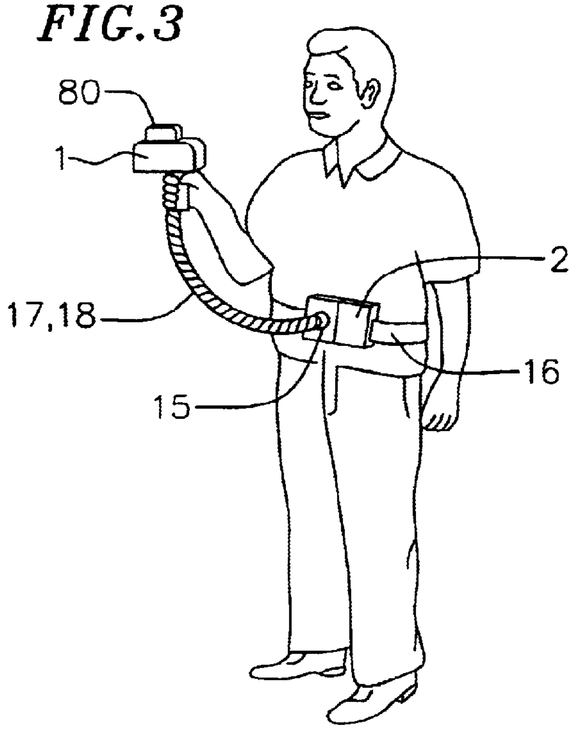
FIG. 3 shows a schematic diagram of a user with a hand-held device and a support device positioned on a waist strap.

FIG. 3 shows a schematic drawing of the use of the hand-held laser inscription device according to the invention and its composition from a hand-held device 1 and a support device 2, which in this embodiment of the invention can be secured around the waist of a user with a waist or pelvis strap 16. Alternative methods of securing the support device are a ruck-sack form with a support device to be secured on the back of the user as well as side (belt) attachments.

The connection between the hand-held device 1 and the support device 2 is achieved by means of a cable connection 17, 18, whereby this consists of a glass fiber cable and/or an electric connection cable.

The hand-held device 1 can, for example, be coupled with a video camera 80, which for the purpose of signal input allows images to be recorded of objects or people, whereby these recordings are further processed by means of signal processing of the control unit for the purpose of controlling the solid-state laser and the refraction unit.

In a configuration according to FIG. 1, the hand-held device 1 contains the refraction unit 7 and possibly the sensor unit 8/80. In this embodiment of the invention, the support device 2 contains the solid-state laser, the control unit and power pack.

In a configuration according to FIG. 2, the hand-held device 1 contains the laser arrangement and the refraction unit 7, possibly in association with a sensor component. In this configuration, the support device 2 contains the control unit and the power pack. On the front side of the support device 2 there is a connection point 15 of the support device 2 for the connection 17, 18 to the hand-held device and for an external control and monitoring unit.

In order to reduce the dimensions of the support device 2, the latter contains, as far as possible, foil circuits in association with SMD components, in such away that the support device 2 can be positioned comfortably around the waist of a user. As an alternative, instead of the foil circuits, multi-layer configurations with SMD components can also be provided.

Figure 4:
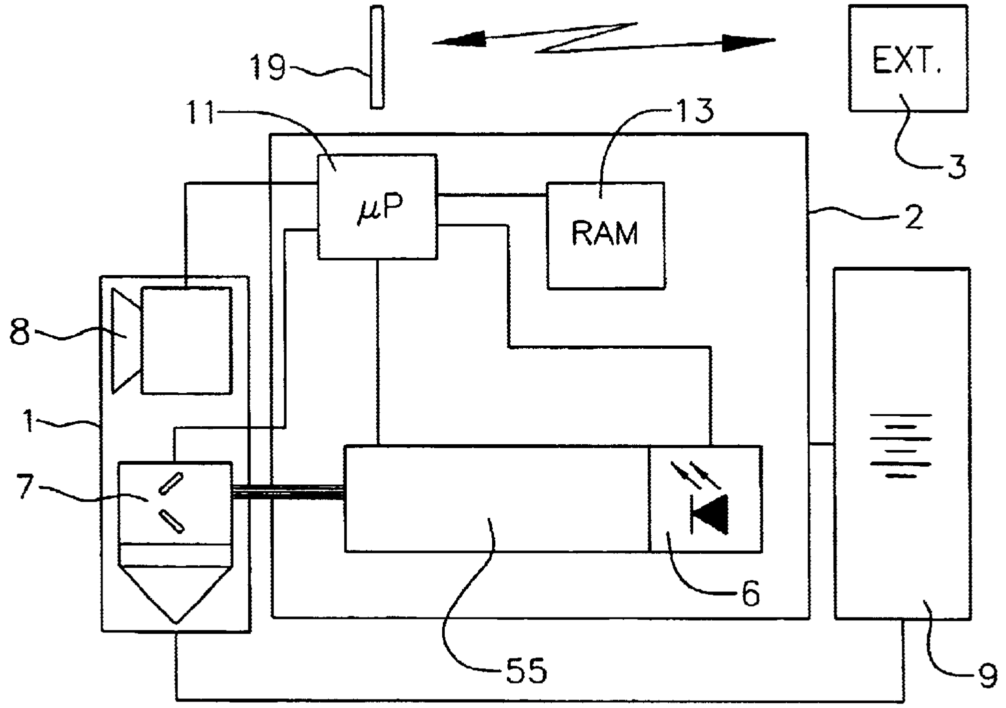
FIG. 4 shows a schematic functional block diagram of a hand-held laser inscription device with wireless signal input.

The embodiment of a hand-held laser inscription device shown as a functional block diagram in FIG. 4 shows the configuration of a semi-conducting laser with a laser diode 6 and a collimator lens system 55, as well as the control unit with a processor 11 and a storage component 13 in a support device. The power pack 9 (accumulator) can be coupled with the support device or it can constitute a separate support device.

According to this embodiment of the invention, the hand-held device 1 contains a refraction unit 7 with two reflectors. Furthermore, as in the embodiment according to FIG. 1, a sensor unit 8 can be connected to the hand-held device 1.

The signal input can take place by means of the sensor unit or by means of a wireless connection from an external data input device 3. For this purpose, there is a radio, infra-red or ultrasound transceiver which is connected to a transceiver component 19 on the side of the control unit. A corresponding transceiver component is provided on the external control unit 3.

FIGS. 5*a* to 5*d* show the resonator which consists of the crystal 50, the reflector 52 reflecting at 99.9% and the output reflector 53 which reflects around 88% of the light and transmits 12% of the light.

Figure 5A:
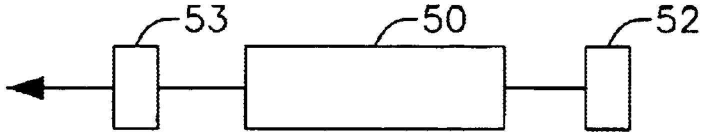
FIG. 5 shows possible reflector configurations for shortening the resonator length.

FIG. 5*a* shows a configuration of the resonator component which has been generally used up to now. The two reflectors 52 and 53 as well as the crystal 50 are arranged behind one another in such a way that the laser beam leaves the output reflector 53 directly without any deflection.

Figure 5B:
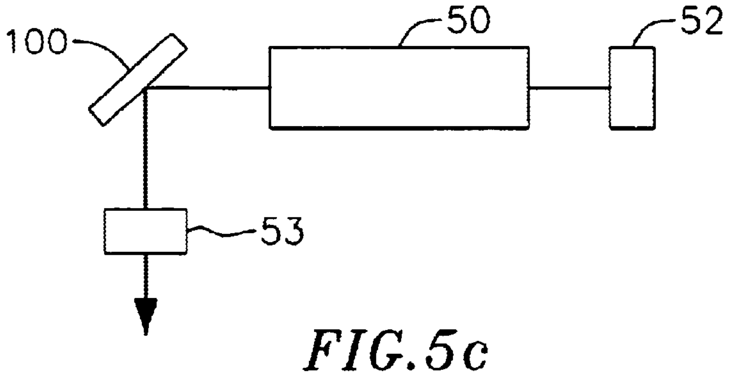

In order to make the hand-held laser inscription device even more compact, the resonator according to FIG. 5*b* has, in addition to the afore-mentioned resonator components, a reflector 100 which is positioned at an angle of 45° to the axis of the beam. As a result of this configuration, the laser beam is deflected by 90° before it leaves through the output reflector 53. The deflection results in a folded optical train which allows more compact construction of the resonator and thus a further increase in the compactness of the hand-held laser inscription device.

Figure 5C:
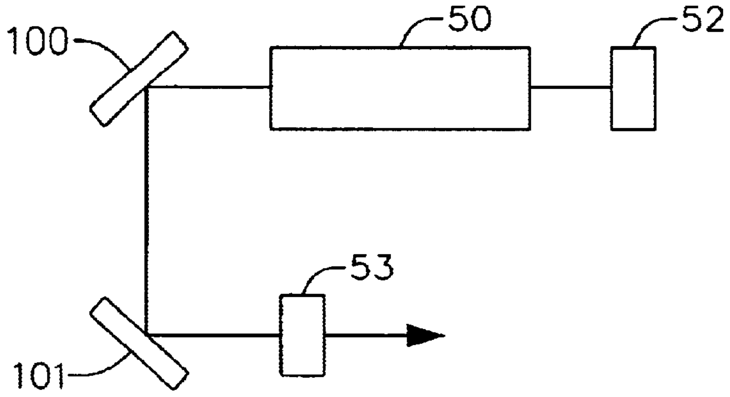

As is shown in FIG. 5*c*, this effect is intensified still further as the laser beam deflected according to FIG. 5*b* is deflected again by 90° by means of a further reflector 101 positioned at an angle of 45° to the axis of the beam before it leaves through the reflector 53.

The folded optical train resulting from this deflection facilitates such a compact construction of the resonator that the length of the resonator in comparison with conventional resonators and the entire dimensions of the device are clearly reduced.

Figure 5D:
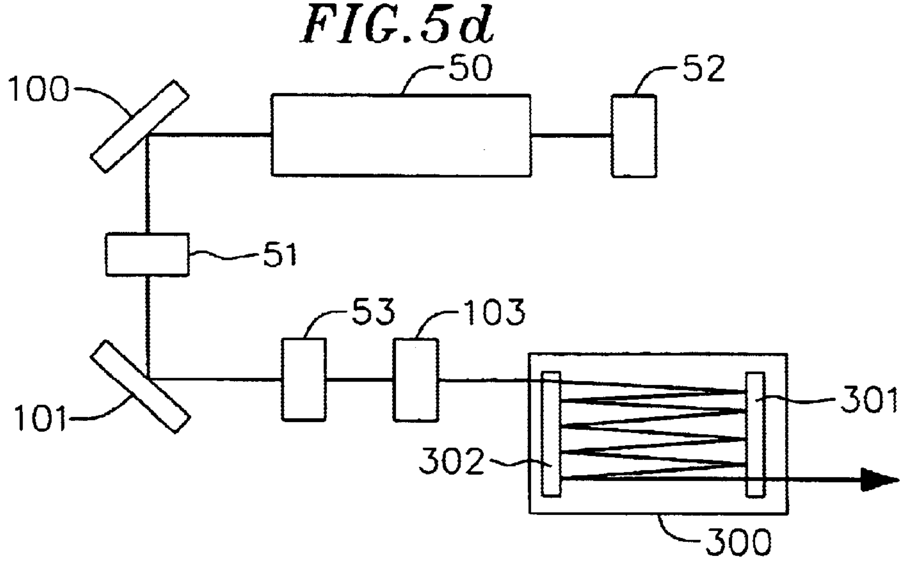

FIG. 5*d* shows a further embodiment following FIG. 5*c*. According to the embodiment shown in FIG. 5*d*, the optical train also has a Q-switch 51 (active or passive Q-switching) between the two reflectors 100 and 101. Also, after the reflector 53 there is a shutter 103, which is used to release the laser beam when the object to be inscribed is correctly positioned. Behind the shutter 103 there is a reflector system 300 for spreading the laser beam, whereby this reflector system consists of two reflectors 301 and 302. The laser beam going into the reflector system 300 is not output until after multiple reflection on the two reflectors 301 and 302.

What is claimed is:

1. A transportable device for inscribing materials remote from the transportable device, comprising:

a hand-held device having a refraction unit within the hand-held device;

a support device remotely connected to the hand-held device, the support device having both a control unit and a power pack within the support device; and a laser providing a laser beam for inscribing the materials, the laser being locatable either within the hand-held device or within the support device.

2. The transportable device according to claim 1, wherein the hand-held device is connected by means of the glass fiber cable to the support device.

3. The transportable device according to claim 1, wherein the hand-held device is connected to a sensor unit, the sensor unit being one of a scanner, a video camera, and a digital camera.

4. The transportable device according to claim 1, wherein the hand-held device is in a form suited to the anatomy of a hand.

5. The transportable device according to claim 1, wherein the support device can preferably be connected to a strap for one of a waist and shoulder.

6. The transportable device according to claim 1, further comprising a recording unit for objects to be inscribed, wherein the laser has a beam which is capable of being focused a focus distance, wherein the recording unit has a distance-measuring device for emitting a distance reading which controls focusing of the laser beam, and a switching device for releasing the laser beam when the object to be inscribed is correctly positioned.

7. The transportable device according to claim 6, further comprising a lens system for adjusting the focus distance wherein the lens system is a lens system of an auto-focus camera.

8. The transportable device according to claim 1, further comprising a recording unit with a mechanical catch for static focusing of the laser beam, wherein the recording unit is for objects to be inscribed.

9. The transportable device according to claim 1, further comprising an external control and/or input unit, wherein the control unit is connected to the external control and/or input unit wirelessly, and wherein the wireless connection is by means of one of a radio, an infra-red transceiver and an ultrasound transceiver.

10. The transportable device according to claim 1, wherein at least one of the control unit and the power pack consists of foil circuits with components secured in SMD technology.

11. The transportable device according to claim 1, wherein the laser consists of a solid-state laser which is one of longitudinally and transversely pumped with a laser diode, wherein the pump volume of the laser corresponds to a basic mode volume of material to be pumped, and wherein the laser has a laser bank with a laser crystal, a Q-switch, a highly-reflecting resonator reflector, and an output reflector.

12. The transportable device according to claim 11, wherein the laser crystal has a tension birefringence below a minimum limit, a fluorescence durability above a maximum limit, and dimensions below a minimum limit.

13. The transportable device according to claim 11, wherein the laser is a solid-state laser which is continuously pumped and one of Q-switched and modulated by means of a crystal, wherein the crystal is one of an opto-acoustic crystal, and a FTIR crystal.

14. The transportable device according to claim 11, wherein the laser is a solid-state laser which is driven by means of a passive Q-switch component and driven by one of a continuous wave and the laser diode, wherein the laser diode is pulse-controlled.

15. The transportable device according to claim 11, wherein the efficiency rate of the laser diode is above a maximum limit.

16. The transportable device according to claim 11, further comprising a device for cooling the laser diode, the cooling device having a Peltier component.

17. The transportable device according to claim 16, further comprising a laser diode driver and a Peltier driver, wherein the laser diode driver and the Peltier driver are positioned in one of the hand-held device and a support device.

18. The transportable device according to claim 1, wherein the laser includes individual laser components further comprising a resonator length having a folded optical train.

19. The transportable device according to claim 1, further comprising a reflector system as a widening lens system, wherein the reflector system has a reflector configuration with at least one of a folded optical train, and a widening lens system by means of two lenses.

20. The transportable device according to claim 19, wherein the laser has a beam with an axis, wherein the reflector configuration has at least two reflectors positioned at 45° to the axis of the beam.

21. The transportable device according to claim 11, further comprising at least one of optical components and the laser crystal for generating polarized light, the optical components and the laser crystal increasing the diffraction efficiency rate of an acoustic-optical Q-switching component.

22. The transportable device according to claim 1, further comprising at least one lens system with a crystal, wherein the lens system interrupts a laser process in a resonator at the same time as the number of high-frequency power input drops below a minimum limit.

23. The transportable device according to claim 1, further comprising a drive unit having a motor adjusting the refraction unit, wherein the drive unit motor is a drive unit of a read/write head of a data storage unit, wherein the data storage unit is one of a magnetic and an optical data storage unit.

24. A device for inscribing materials, comprising:

a laser;

a refraction unit;

a control unit; and a power pack, wherein:

the laser, the refraction unit, the control unit and the power pack consist of compact, transportable components;

a hand-held device is provided containing the refraction unit, and a support device is provided containing at least the control unit and the power pack, the support device being connected to the hand-held device.

25. The device according to claim 24, wherein the hand-held device is connected by means of the glass fiber cable to the support device.

26. The device according to claim 24, wherein the hand-held device is connected to a sensor unit, the sensor unit being one of a scanner, a video camera, and a digital camera.

27. The device according to claim 24, wherein the hand-held device is in a form suited to the anatomy of a hand.

28. The device according to claim 24, wherein the support device can preferably be connected to a strap for one of a waist and shoulder.

29. The device according to claim 24, further comprising a recording unit for objects to be inscribed, wherein the laser leas a beam which is capable of being focused a focus distance, wherein the recording unit has a distance-measuring device for emitting a distance reading which controls focusing of the laser beam, and a switching device for releasing the laser beam when the object to be inscribed is correctly positioned.

30. The device according to claim 29, further comprising a lens system for adjusting the focus distance wherein the lens system is a lens system of an auto-focus camera.

31. The device according to claim 24, further comprising a recording unit with a mechanical catch for static focusing of the laser beam, wherein the recording unit is for objects to be inscribed.

32. The device according to claim 24, further comprising an external control and/or input unit, wherein the control unit is connected to the external control and/or input unit wirelessly, and wherein the wireless connection is by means of one of a radio, an infra-red transceiver and an ultrasound transceiver.

33. The device according to claim 24, wherein at least one of the control unit and the power pack consists of foil circuits with components secured in SMD technology.

34. The device according to claim 24, wherein the laser consists of a solid-state laser which is one of longitudinally and transversely pumped with a laser diode, wherein the pump volume of the laser corresponds to a basic mode volume of material to be pumped, and wherein the laser has a laser bank with a laser crystal, a Q-switch, a highly-reflecting resonator reflector, and an output reflector.

35. The device according to claim 34, wherein the laser crystal has a tension birefringence below a minimum limit, a fluorescence durability above a maximum limit, and dimensions below a minimum limit.

36. The device according to claim 34, wherein the laser is a solid-state laser which is continuously pumped and one of Q-switched and modulated by means of a crystal, wherein the crystal is one of an opto-acoustic crystal, and a FTIR crystal.

37. The device according to claim 34, wherein the laser is a solid-state laser which is driven by means of a passive Q-switch component and driven by one of a continuous wave and the laser diode, wherein the laser diode is pulse-controlled.

38. The device according to claim 34, wherein the efficiency rate of the laser diode is above a maximum limit.

39. The device according to claim 34, further comprising a device for cooling the laser diode, the cooling device having a Peltier component.

40. The device according to claim 39, further comprising a laser diode driver and a Peltier driver, wherein the laser diode driver and the Peltier driver are positioned in one of the hand-held device and a support device.

41. The device according to claim 24, wherein the laser includes individual laser components further comprising a resonator length having a folded optical train.

42. The device according to claim 24, further comprising a reflector system as a widening lens system, wherein the reflector system has a reflector configuration with at least one of a folded optical train, and a widening lens system by means of two lenses.

43. The device according to claim 42, wherein the laser has a beam with an axis, wherein the reflector configuration has at least two reflectors positioned at 45° to the axis of the beam.

44. The device according to claim 34, further comprising at least one of optical components and the laser crystal for generating polarized light, the optical components and the later crystal increasing the diffraction efficiency rate of an acoustic-optical Q-switching component.

45. The device according to claim 24, further comprising at least one lens system with a crystal, wherein the lens system interrupts a laser process in a resonator at the same time as the number of high-frequency power input drops below a minimum limit.

46. The device according to claim 24, further comprising a drive unit having a motor adjusting the refraction unit, wherein the drive unit motor is a drive unit of a read/write head of a data storage unit, wherein the data storage unit is one of a magnetic and an optical data storage unit.

* * * * *

UNITED STATES PATENT AND TRADEMARK OFFICE

CERTIFICATE OF CORRECTION

PATENT NO. : 6,700,094 B1
DATED : March 2, 2004
INVENTOR(S) : Kuntze

It is certified that error appears in the above-identified patent and that said Letters Patent is hereby corrected as shown below:

Column 10,
Line 35, after “unit”, delete “,” insert -- ; --
Line 52, delete “leas”, insert -- has --

Signed and Sealed this

Twenty-second Day of February, 2005

JON W. DUDAS
*Director of the United States Patent and Trademark Office*

UNITED STATES PATENT AND TRADEMARK OFFICE

CERTIFICATE OF CORRECTION

PATENT NO. : 6,700,094 B1
DATED : March 2, 2004
INVENTOR(S) : Kuntze

It is certified that error appears in the above-identified patent and that said Letters Patent is hereby corrected as shown below:

Title page,
Item [30], Foreign Application Priority Data, delete "197 06 086" insert -- 197 06 038.2 --

Signed and Sealed this

Twenty-fourth Day of May, 2005

JON W. DUDAS
*Director of the United States Patent and Trademark Office*